H. HESS.
SHAFT BEARING.
APPLICATION FILED OCT. 16, 1908.
1,151,588.
Patented Aug. 31, 1915.
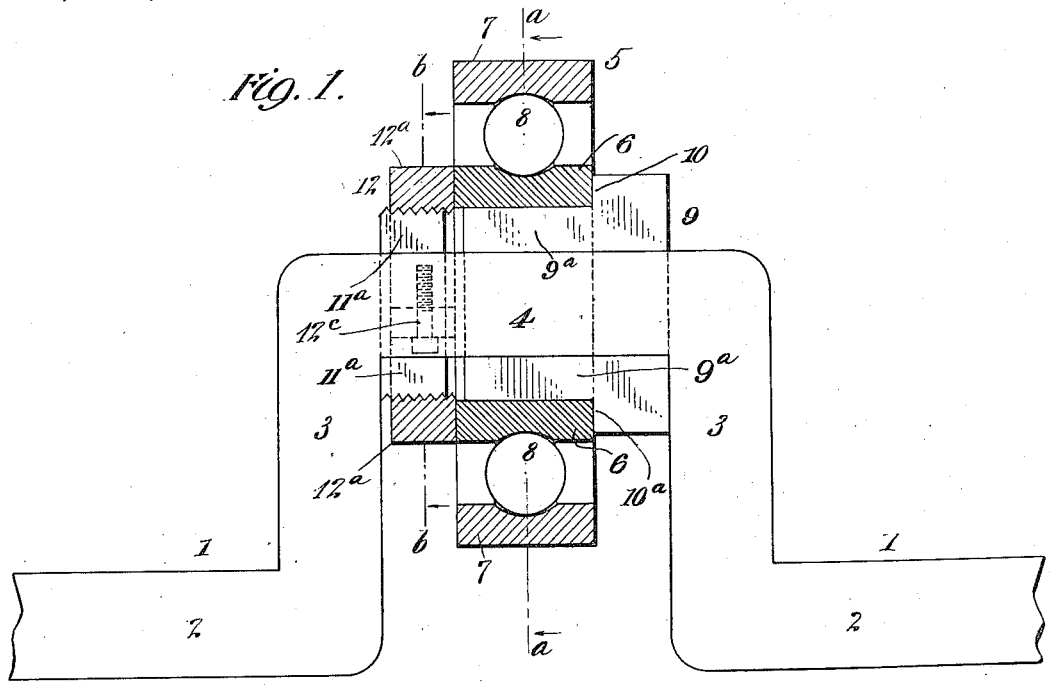
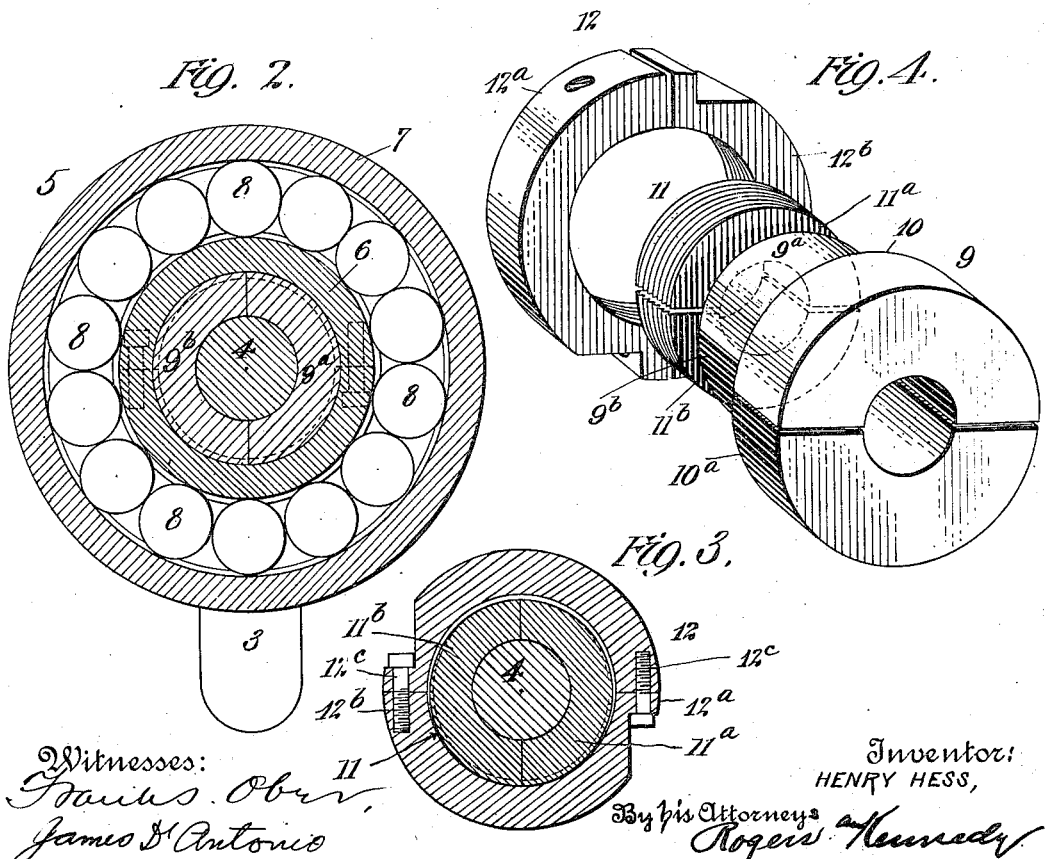
Witnesses:
Inventor:
HENRY HESS,
By his Attorneys
Rogers Kennedy

UNITED STATES PATENT OFFICE.

HENRY HESS, OF WAWA, PENNSYLVANIA, ASSIGNOR TO THE HESS-BRIGHT MANUFACTURING COMPANY, OF PHILADELPHIA, PENNSYLVANIA, A CORPORATION OF DELAWARE.

SHAFT-BEARING.

1,151,588.  Specification of Letters Patent.  Patented Aug. 31, 1915.

Application filed October 16, 1908. Serial No. 458,011.

*To all whom it may concern:*

Be it known that I, HENRY HESS, a citizen of the United States, residing at Wawa, in the county of Delaware and State of Pennsylvania, have invented certain new and useful Improvements in Shaft-Bearings, of which the following is a specification, reference being had therein to the accompanying drawing.

This invention relates to ball or roller bearings intended more particularly for application to crank shafts, and is designed with special reference to the assemblage of and attachment to one-piece crank shafts, of what are known commercially and in the art as "unit-handling bearings," comprising inner and outer casing elements or rings and interposed rolling members. In the assemblage of a bearing of this type on a one-piece or integral crank shaft, it is necessary to pass the bearing element over the webs or angles of the shaft to get it finally in place on the wrist portion, and, to permit the angles to be passed, it is necessary that the bore of the inner casing element be appreciably greater in diameter than the diameter of the wrist. This condition renders it necessary, in order that the bearing may be held securely and properly in place on the wrist, that some means be provided for filling in the annular space between the interior of the inner casing element and exterior of the wrist; and also, that means be provided for securely confining the said inner casing element endwise, in order to absorb the vibrations to which the bearing in practice is subjected, and prevent them from being received directly by the crank shaft.

My invention is designed to fulfil these requirements, and it consists of a bushing of improved form and construction adapted to be applied between the wrist and inner casing element and serving to fill in the annular space between said parts, and in the combination therewith, of means for confining the inner casing element endwise on the wrist between the crank portions, in such manner as to prevent any looseness or play of the element along the wrist and so as to offer a frictional resistance to vibrations and shocks which would otherwise be transmitted directly to the shaft, and by a peening action thereon cause wear and looseness.

In its more specific aspect, the invention contemplates a bushing of sectional form with annular shoulders at one end, which bushing is adapted to embrace the wrist of the crank shaft and extend and fill in the space between the same and the inner casing element, with the ends of the sections of the bushing bearing against the adjacent crank arm, and the shoulders bearing against the adjacent end of the inner casing element. Coöperating with a bushing of this form is a second sectional bushing adapted to embrace the wrist between the opposite side of the bearing and the crank arm on that side, which bushing is threaded exteriorly to receive a sectional surrounding nut, which latter, by being screwed up against the adjacent end of the inner casing element, will force the threaded bushing in the opposite direction against the radial crank arm, and in this manner firmly clamp and bind the casing element between the nut and the shoulders on the bushing, the parts being held firmly and securely in position between the radial crank arms.

In the accompanying drawings Figure 1 is a longitudinal sectional view of a crank shaft and unit bearing applied in accordance with my invention. Fig. 2 is a transverse section through the same on the line *a a*. Fig. 3 is a similar view on the line *b b*. Fig. 4 is a perspective view of the parts of the sectional bushing and the fastening nut detached and separated.

Referring to the drawings 1 represents a crank shaft comprising the shaft proper 2, the radial crank arms 3, and the wrist portion 4, which parts are, in the present instance, shown as integral forming a one-piece structure.

5 represents a unit handling bearing comprising an inner casing element in the form of a continuous ring 6 and an outer casing element in the form of a continuous ring 7 concentrically surrounding the inner ring, and a series of rolling members 8 interposed between the two casing elements and consisting in the present instance of friction balls traveling in grooves or raceways in the adjacent opposing faces of the casing elements. The bore of the inner casing element is, as shown, appreciably greater in diameter than the diameter of the wrist portion of the shaft, which relation of the parts is necessary in order to permit the bearing to be passed around the angles or webs at the junction of the radial crank arms with the wrist and shaft proper to bring the bearing to position on the wrist. In order, therefore, that this annular space may be filled in to properly secure and center the casing element thereon, I provide a bushing 9 in the form of two half sections 9ª and 9ᵇ, embracing the wrist portion and extending in and filling the annular space between the same and the inner casing element. These sections of the bushing are formed on their ends with shoulders 10 and 10ª bearing at their inner faces against the adjacent end of the casing element 6, and at their outer faces or ends of the bushing against the radial arm on that side of the bearing.

11 represents a second bushing in the form of two half sections 11ª and 11ᵇ embracing the wrist at the opposite side of the bearing and threaded exteriorly and bearing at its outer end against the adjacent crank arm, which threaded bushing is encircled by a nut 12 preferably formed of two half sections 12ª and 12ᵇ fastened together by clamping bolts 12ᶜ, which nut, by being screwed up against the end of the inner casing element, will force the threaded bushing in the opposite direction against the crank arm, the shoulders 10 and 10ª against the opposite crank arm with the inner casing element clamped firmly and forcibly between the nut and inner faces of the shoulders, in which position the nut may be caused to tightly embrace the threaded bushing so as to hold the parts against accidental looseness, by means of the fastening bolts 12ᶜ.

In assembling the parts, the half sections of the bushing 9 are first applied laterally to the wrist portion of the shaft with the shoulders 10 and 10ª close up against the adjacent crank arm. The bearing element is then passed over the end of the shaft and around the angles and onto the wrist portion and finally slipped over the sections of the bushing and up against the inner faces of the shoulders thereon. The sections of the threaded bushing 11 are now applied laterally to embrace the wrist between the opposite side of the bearing and the crank arm on that side, to which is finally applied the two sections of the nut 12, the parts of the nut being fastened together by the bolts 12ᶜ. The nut is now screwed up on the threaded bushing against the casing element 6, with the result that the threaded bushing will be forced outwardly against the crank arm and re-acting through the nut and casing element the bushing 9 will be forced against the opposite crank arm, and the casing element will be clamped firmly between the shoulders 10 and 10ª and the nut.

From the foregoing description it will be noted that the bushing sections 9 and 11 form in effect a bushing member which encircles the wrist portion of the crank shaft between the two cranks, and which bushing member bears at its opposite ends against said cranks, the latter thus constituting abutments against which the pressure acts for clamping the casing member of the bearing in place. Further, it will be noted that the nut 12 in connection with the bushing section 11 constitutes in effect an extensible means, which when operated, as by the screwing up of the nut, will act against the crank on that side and against the casing element in clamping the latter on the bushing section 9, and the bushing section 9 against the other crank.

It is to be noted in connection with my invention that provision is made for clamping the inner casing element endwise. This I deem of great advantage and importance in that the pressure applied to the sides or ends of the casing element exerts a frictional resistance in such direction that the vibrations to which the parts are in practice subjected will be met by this resistance, and the shocks and vibrations will be absorbed, so that the shaft will be relieved of the direct effect of the same, which would otherwise act by a hammering action to cause a looseness of the seat of the bearing. It will be understood, therefore, that, in this respect, my invention is not limited in its application to a crank shaft, but is intended to embrace means broadly for applying a clamping pressure endwise to the inner casing element, so as to confine it on its bearing seat.

From the construction described it will be seen that the two crank arms 3, in connection with the wrist portion 4, form in effect abutments against which two sectional bushings 9 and 11 are adapted to bear in the operation of applying endwise clamping pressure to the casing element.

Having thus described my invention, what I claim is:

1. In combination with a crank shaft, a detachable bushing member surrounding the wrist portion thereof and comprising endwise-separable sections adapted to bear respectively against the radial cranks, an anti-friction bearing casing-element surrounding one of the sections of the bushing member and having a seat thereon, and a movable member acting on the casing element and acting also on the other bushing section, and adapted when moved, to separate the sections of the bushing member endwise and bind the same against the cranks, while clamping the casing element on the bushing member in definite predetermined position.

2. In combination with a crank shaft, an anti-friction bearing mounted on the wrist portion thereof, and comprising inner and outer casing elements and interposed rolling members, a bushing surrounding the wrist within the inner casing element, and bearing at one end against the adjacent crank arm, said bushing being provided with a shoulder, against which the adjacent end of the inner casing element bears, an exteriorly threaded bushing on the wrist at the opposite side of the bearing adapted to bear against the crank arm on that side, and a nut embracing the threaded bushing and adapted to bear against the adjacent end of the inner casing element.

3. In combination with a one-piece crank shaft, an anti-friction bearing comprising inner and outer casing elements and interposed rolling members, the bore of the inner casing element being of a diameter to allow the bearing to be applied to the wrist by passing the same over the angles or web of the crank shaft, a sectional bushing adapted to extend in the annular space between the exterior of the wrist and the interior of the inner casing element, and provided with shoulders against which one end of the casing element is adapted to bear, a sectional exteriorly threaded bushing surrounding the wrist at the opposite side of the bearing and adapted to bear against the adjacent crank arm, and an adjusting nut embracing the threaded bushing and adapted to bear against the adjacent end of the inner casing element.

4. In combination with a crank shaft, a bushing encircling the wrist portion thereof and provided at one end with a shoulder bearing against the crank at that side, an anti-friction bearing casing-element surrounding the bushing and bearing at one end against said shoulder, and extensible means between the opposite end of said element and the crank at that side, said means adapted when operated to act against said last mentioned crank and against the casing element to clamp the latter endwise against the shoulder.

5. In combination with a crank shaft, a bushing encircling the wrist portion of the same, an anti-friction bearing casing-element on said bushing, a shoulder at the end of the bushing bearing against the crank at that side and against which shoulder one end of the casing element bears and means bearing against the opposite end of the casing element and against the other crank, said means adapted when operated to clamp the casing element endwise against the shoulder and the latter against the first mentioned crank.

In testimony whereof I have affixed my signature in presence of two witnesses.

HENRY HESS.

Witnesses:
MARY M'CALLA,
NETTIE L. HAHN.